United States Patent
Liu et al.

(10) Patent No.: US 11,227,143 B2
(45) Date of Patent: Jan. 18, 2022

(54) AUTOMATIC CLASSIFICATION METHOD OF WHOLE SLIDE IMAGES OF CERVICAL TISSUE PATHOLOGY BASED ON CONFIDENCE COEFFICIENT SELECTION

(71) Applicant: Wuhan University, Wuhan (CN)

(72) Inventors: Juan Liu, Wuhan (CN); Zhuoyu Li, Wuhan (CN); Jing Feng, Wuhan (CN); Zhiqun Zuo, Wuhan (CN)

(73) Assignee: Wuhan University, Wuhan (CN)

( * ) Notice: Subject to any disclaimer, the term of this patent is extended or adjusted under 35 U.S.C. 154(b) by 0 days.

(21) Appl. No.: 17/026,873

(22) Filed: Sep. 21, 2020

(65) Prior Publication Data

US 2021/0271852 A1   Sep. 2, 2021

(30) Foreign Application Priority Data

Feb. 27, 2020   (CN) .......................... 202010125696.6

(51) Int. Cl.
  *G06K 9/00*   (2006.01)
  *G06K 9/62*   (2006.01)
  *G06T 7/00*   (2017.01)

(52) U.S. Cl.
  CPC ....... *G06K 9/00147* (2013.01); *G06K 9/0014* (2013.01); *G06K 9/628* (2013.01); *G06K 9/6256* (2013.01); *G06K 9/6269* (2013.01); *G06T 7/0014* (2013.01); *G06T 2207/20021* (2013.01); *G06T 2207/20036* (2013.01); *G06T 2207/20081* (2013.01); *G06T 2207/30024* (2013.01)

(58) Field of Classification Search
  CPC .......... G06K 9/00127; G06K 9/00134; G06K 9/0014; G06K 9/00147; G06K 9/6256; G06K 9/6269; G06K 9/628; G06T 7/0012; G06T 7/0014; G06T 2207/20021; G06T 2207/20036; G06T 2207/20081; G06T 2207/20084; G06T 2207/30024
  See application file for complete search history.

(56) References Cited

U.S. PATENT DOCUMENTS

| | | | |
|---|---|---|---|
| 10,769,788 B2* | 9/2020 | Song | G16H 80/00 |
| 2017/0270346 A1* | 9/2017 | Ascierto | G06K 9/00134 |
| 2018/0114317 A1* | 4/2018 | Song | G06K 9/6223 |
| 2018/0182099 A1* | 6/2018 | Lesniak | G06K 9/036 |
| 2019/0080453 A1* | 3/2019 | Song | G06K 9/6269 |

(Continued)

*Primary Examiner* — Atiba O Fitzpatrick
(74) *Attorney, Agent, or Firm* — The Dobrusin Law Firm, P.C.

(57) ABSTRACT

An automatic classification method of whole slide images (WSIs) for cervical tissue pathology based on confidence coefficient selection. The automatic classification method includes steps: S1: dividing the WSIs for the cervical tissue pathology into small pieces having set size, gathering the small pieces of each WSI into a packet, and removing blank pieces in the packets; S2: building a deep CNN model; S3: training the deep CNN for designated rounds; S4: performing sequential arrangement and connection to obtain feature vectors of WSIs by using the trained deep CNN as the feature extractor; S5: training a support vector machine classifier; and S6: processing the WSIs for the cervical tissue pathology, to be classified, through step S1 and step S4 to obtain the feature vectors of the images, and inputting the feature vectors into the trained support vector machine classifier to realize classification.

9 Claims, 5 Drawing Sheets

(56) References Cited

U.S. PATENT DOCUMENTS

| 2020/0143542 A1* | 5/2020 | Barnes | G06T 7/0016 |
| 2020/0294231 A1* | 9/2020 | Tosun | G06T 7/0012 |
| 2021/0073986 A1* | 3/2021 | Kapur | G06K 9/00147 |

* cited by examiner

AUTOMATIC CLASSIFICATION METHOD OF WHOLE SLIDE IMAGES OF CERVICAL TISSUE PATHOLOGY BASED ON CONFIDENCE COEFFICIENT SELECTION

TECHNICAL FIELD

The present invention relates to the field of automatic screening and analyzing of cervical tissue pathology images, in particular to an automatic classification method of whole slide images for cervical tissue pathology, and belongs to an application of a neutral network model based on machine learning to medical diagnosis.

BACKGROUND

Cervical cancer is one of the most common gynecologic cancers, and is the fourth factor harmful to physical and mental health of women. Early detection and early treatment of the cervical cancer are critical. A development process of the cervical cancer includes normal tissue, intraepithelial precancerous lesions and infiltrating carcinoma breaking through an epithelial basement membrane. Precancerous lesions refer to a series of lesions before the infiltrating carcinoma, and are also called as cervical intraepithelial neoplasia (CIN). To assess severity of precancerous cervical lesions, the precancerous lesions include 3 grades (CIN1, CIN2 and CIN3). A clinical diagnostic process for the cervical cancer includes steps of firstly performing early screening, obtaining suspicious niduses, sending biopsies to a pathology laboratory, performing staining with hematoxylin-eosin, and finally allowing a pathologist to observe sections under a high power microscope, analyze a tissue structure in the sections, analyze cell morphology and make a definite diagnosis.

A whole histological grading evaluation process completely depends on observation of the pathologist under the microscope and manual evaluation with personal experience. The work is time-consuming and labor-consuming and requires the pathologist to have good professional quality, but it must take much money and long time to train a pathology expert having accredited professional knowledge and rich experience after long-time accumulation of knowledge and experience. Subjective factors of personal experience, fatigue strength and the like of doctors greatly influence accuracy of a result.

To overcome disadvantages of existing manual evaluation, with development of digital pathology, through a scanning and connection technique, a pathology laboratory can obtain massive cervical tissue pathology images. The cervical tissue pathology images have important clinical significance in developing a computer-aided diagnosis system, realizing accurate, efficient, objective and quantitative analysis of histological images, automatically learning cervical cancer histological features, further performing histological graded diagnosis on pathology images, assisting the pathologist to perform diagnosis, alleviating working burdens of the pathologist, improving diagnosis efficiency, and providing doctors with objective and accurate diagnosis results.

At present, a certain amount of research in the field of diagnosis of cervical tissue pathology whole slide images (WSIs) also exists at home and abroad, but due to a small quantity of medical images with annotations and complexity of the cervical tissue pathology images, an automatic classification algorithm of WSIs for cervical tissue pathology is still in a theoretical stage. Most of current cervical tissue pathology diagnosis algorithms are classification algorithms realizing grading of precancerous cervical lesions by a feature extraction method based on division of cervical epithelia. But the methods are complex in steps and low in efficiency, and in addition, it is difficult to achieve accuracy required by medical aided diagnosis algorithms in the process of dividing cervical epithelia and feature extraction due to diversity of cervical epithelial images in practical application. However, a deep learning method is difficult to apply due to oversized dimension and high complexity of the WSIs of tissue pathology.

SUMMARY

To solve problems of low efficiency and low accuracy of existing automatic classification methods of whole slide images (WSIs) for cervical tissue pathology in the prior art, the present invention performs improvement based on deep learning and provides an automatic classification method of WSIs for cervical tissue pathology based on confidence coefficient selection to assist a doctor to perform diagnosis, alleviate working loads of the doctor, improve diagnosis efficiency and provide the doctor with objective and accurate diagnosis results.

An automatic classification model of WSIs for cervical tissue pathology is formed through training in advance with training samples of WSIs for cervical tissue pathology prepared in advance. The WSIs for the cervical tissue pathology, to be classified, are classified with the automatic classification model of WSIs for cervical tissue pathology. The automatic classification method also includes the following steps:

step 1: dividing the WSIs for the cervical tissue pathology into small pieces having set size, gathering the small pieces of each WSI into a packet, and removing blank pieces in the packets;

step 2: building a deep convolutional neural network model recorded as a classification model A, and randomly initializing parameters in the classification model A;

step 3: training the classification model A for designated rounds, and selecting top k small pieces with the highest confidence coefficients in each packet during training each round as inputs;

step 4: using the last fully connected layer of the classification model A as a feature extractor, extracting features of top m small pieces with highest confidence coefficients in each packet, and performing sequential arrangement and connection on the extracted features to be used as a feature vector of each WSI for the cervical tissue pathology;

step 5: training a support vector machine classifier using the feature vectors generated in step 4 as inputs, where a trained support vector machine classifier is obtained by using sequential minimal optimization in the training process; and step 6: processing the WSIs for the cervical tissue pathology, to be classified, through step 1 and step 4, to obtain the feature vectors of the images, and inputting the feature vectors into the trained support vector machine classifier to realize classification of WSIs; and classifying WSIs into two categories according to lesion grades, including Negative for negative WSIs for cervical tissue pathology and Positive for positive WSIs for cervical tissue pathology.

According to the automatic classification method of WSIs for cervical tissue pathology based on confidence coefficient selection, in step 1 of removing the blank pieces in the packets, firstly masks of small-piece images are generated based on an Otsu algorithm, and then the masks are subjected to morphological operations to obtain final small-piece image masks. The ratio of the area of blank pieces to that of small-piece images is calculated based on the area of the small-piece image masks to determine whether the small-piece images are blank pieces or not.

According to the automatic classification method of WSIs for cervical tissue pathology based on confidence coefficient selection, the step of obtaining the final small-piece image masks through morphological operations on the masks specially includes substeps of firstly performing erosion operations on preliminary image masks to eliminate noise, and then performing expansion operations to close small holes or opaque areas in objects.

According to the automatic classification method of WSIs for cervical tissue pathology based on confidence coefficient selection, in step 2 of building the deep convolutional neural network model, a 56-layer convolutional neural network is built and includes:

(1) a convolutional portion including a convolutional layer and a pooling layer, (2) a residual attention module including 4 residual units and 3 attention modules, and (3) a softmax layer mapping classification probability values to a 0-1 range.

The softmax layer in the automatic classification method of WSIs for cervical tissue pathology based on confidence coefficient selection is a softmax function:

$$S_i = \frac{e^i}{\Sigma_j e^j}$$

where i represents input of the $i_{th}$ neuron, e is a natural constant, $\Sigma_j e^j$ represents a sum of powers using e as a base and the neuron j as an exponent, and $S_i$ represents a result of the $i_{th}$ neuron after softmax.

According to the automatic classification method of WSIs for cervical tissue pathology based on confidence coefficient selection, in step 3 of training the classification model A, a generation process of the classification model includes the following three steps:

step I: inputting the small-piece images into the classification model A, to obtain outputs as the positive confidence coefficients of the small pieces; and determining the positive confidence coefficient of each small piece according to the classification model A;

step II: selecting top k small pieces with the highest positive confidence coefficients in each packet as the inputs of the classification model A, and training the classification model A for a round; and step III: repeating step I and step II until the classification model A converges or reaches the number of training rounds set in advance.

According to the automatic classification method of WSIs for cervical tissue pathology based on confidence coefficient selection, in step II of selecting top k small pieces with the highest positive confidence coefficients in each packet as inputs of the classification model A, top k small pieces with highest positive confidence coefficients in each positive sample packet are used as positive training samples, and top k small pieces with highest negative confidence coefficients in each negative sample packet are used as negative training samples.

According to the automatic classification method of WSIs for cervical tissue pathology based on confidence coefficient selection, in step 5 of training the support vector machine classifier by using the feature vectors generated in step 4 as inputs, feature vectors generated by positive samples are used as the positive training samples, and feature vectors generated by negative samples are used as the negative training samples.

According to the automatic classification method of WSIs for cervical tissue pathology based on confidence coefficient selection, in step 6 of classifying WSIs into two categories according to lesion grades: Negative for negative WSIs for cervical tissue pathology, including WSIs for cervical tissue pathology of two grades of cervicitis and CIN1, and Positive for positive WSIs for cervical tissue pathology, including WSIs for cervical tissue pathology of three grades of CIN2, CIN3 and cancer.

Compared with the prior art, the automatic classification method has the beneficial effects: 1, a new classification method is proposed to effectively improve diagnosis efficiency and accuracy; 2, an improved deep learning method is proposed, and positive small pieces in the positive WSIs for cervical tissue pathology are screened to avoid interference of negative portions in the positive WSIs for cervical tissue pathology on the classification model; and 3, the small pieces well representing image features of the WSIs for cervical tissue pathology are screened by a confidence coefficient selection method, and general features of the WSIs for cervical tissue pathology are obtained through integrating the features of the small pieces.

DETAILED DESCRIPTION

Figure 1:
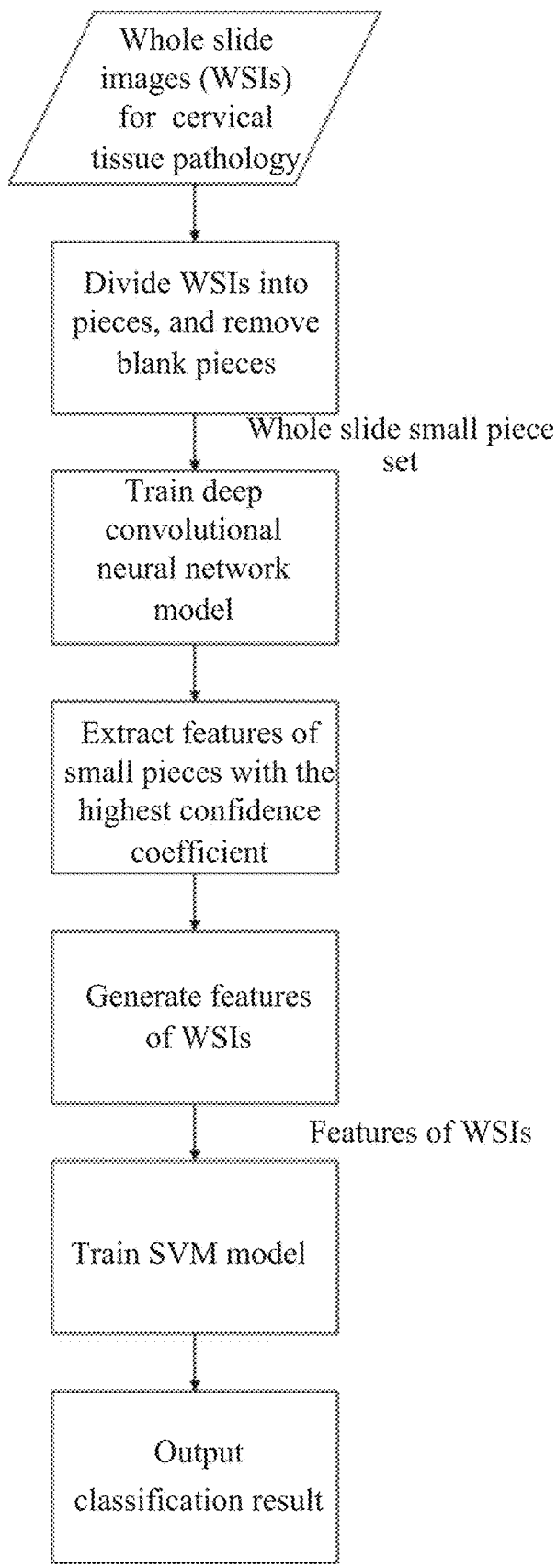
FIG. 1 shows a work flow chart of an automatic classification method of WSIs for cervical tissue pathology based on confidence coefficient selection disclosed by the present invention.
Figure 2:
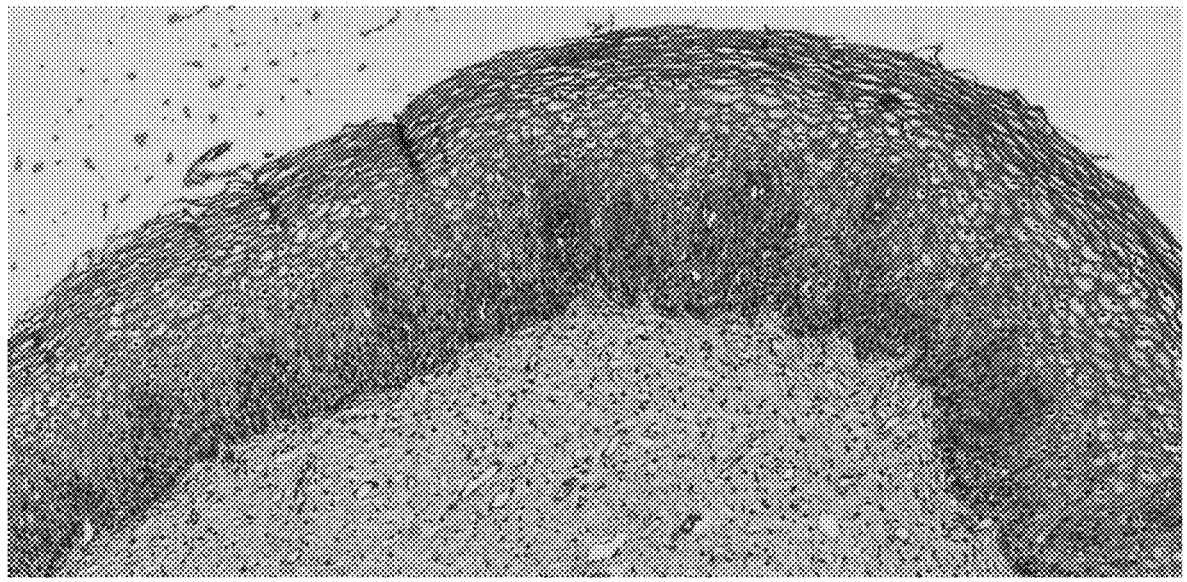
FIG. 2 shows a portion of a WSI for cervical tissue pathology of the Negative category in the automatic classification method of WSIs for cervical tissue pathology based on confidence coefficient selection disclosed by the present invention.
Figure 3:
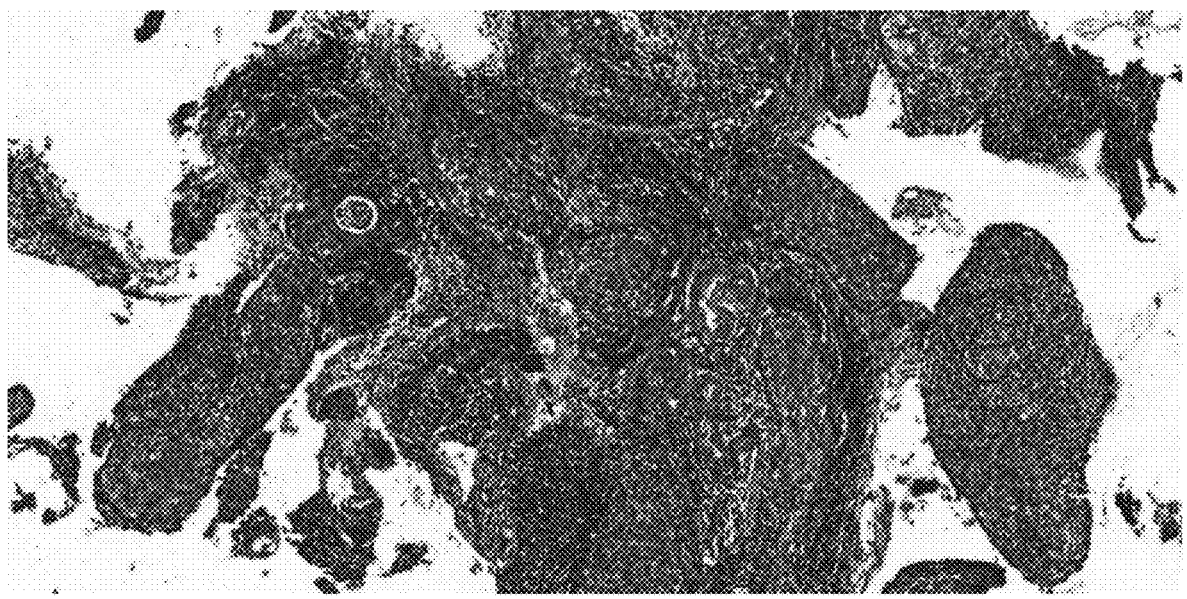
FIG. 3 shows a portion of a WSI for cervical tissue pathology of the Positive category in the automatic classification method of WSIs for cervical tissue pathology based on confidence coefficient selection disclosed by the present invention.
Figure 4:
FIG. 4 shows a block diagram of WSIs for cervical tissue pathology in the automatic classification method of WSIs for cervical tissue pathology based on confidence coefficient selection disclosed by the present invention.

The technical solutions will now be described clearly and completely in the examples of the present invention with reference to appended drawings in the examples of the present invention. Apparently, the described examples are merely a part rather than all of the examples of the present invention. All other examples obtained by a person of ordinary skill in the art based on the examples of the present invention without creative efforts shall fall within the protection scope of the present invention.

Referring to FIG. 1 to FIG. 6, the present invention provides the following technical solution: an automatic classification method of WSIs for cervical tissue pathology includes the following steps:

step 1: dividing WSIs for cervical tissue pathology into small pieces have side length L, and gathering the small pieces of each WSI for cervical tissue pathology into a packet, where preferably, L is 512;

step 2: building a deep convolutional neural network model recorded as a classification model A, and randomly initializing parameters in the classification model A;

step 3: training the classification model A for designated rounds nepochs, and selecting top k small pieces with the highest confidence coefficients in each packet during training each round as inputs, where preferably, nepochs is 50, and k is 20;

step 4: using the last fully connected layer of the classification model A as a feature extractor, extracting features of top m small pieces with the highest confidence coefficients in each packet, and performing sequential arrangement and connection on the extracted features to be used as a feature vector of each WSI for the cervical tissue pathology, where preferably, m is 10;

step 5: training a support vector machine classifier using the feature vectors generated in step 4 as inputs, where sequential minimal optimization is used in the training process; and step 6: processing the WSIs for the cervical tissue pathology, to be classified, through step 1 and step 4, to obtain the feature vectors of the images, and inputting the feature vectors into the trained support vector machine classifier to realize the classification of WSIs; and classifying WSIs into two categories according to lesion grades, including Negative for negative WSIs for cervical tissue pathology and Positive for positive WSIs for cervical tissue pathology.

In the step of removing blank pieces in packets, firstly masks of small-piece images are generated based on an Otsu algorithm, and then the masks are subjected to morphological operations to obtain final small-piece image masks. The ratio of the area of blank pieces to that of small-piece images is calculated based on the area of the small-piece image masks to determine whether the small-piece images are blank pieces or not. The ratio of the area of blank pieces to that of small-piece images is calculated based on the area of the small-piece image masks, when the ratio of the area of blank pieces to that of the small-piece images exceeds a preset value p, the small-piece images are determined to be blank pieces and are removed, and preferably, p is 0.5. An optimal segmentation threshold is obtained through calculating variance of a foreground image and a background image in the Otsu algorithm.

An equation for calculating the variance of the foreground image and the background image:

$$g = \omega_1 \times (\mu - \mu_1)^2 + \omega_2 \times (\mu - \mu_2)^2$$

where $\omega_1$ is the ratio of background pixels, $\omega_2$ is the ratio of foreground pixels, $\mu_1$ is the average grayscale value of the background, $\mu_2$ is the average grayscale value of the foreground, and $\mu$ is the accumulated grayscale value in a 0-M grayscale range. Equations are respectively:

$$\omega_1 = \frac{N_1}{\text{Sum}}$$

$$\omega_2 = \frac{N_2}{\text{Sum}}$$

$$\mu_1 = \sum_{i=0}^{t} i \times Pr(i \mid C_0)$$

$$\mu_2 = \sum_{i=t+1}^{M-1} i \times Pr(i \mid C_1)$$

$$\mu = \mu_1 \times \omega_1 + \mu_2 \times \omega_2$$

where $N_1$ represents the sum of background pixels, $N_2$ represents the sum of foreground pixels, Sum is the sum of all pixels, t is a threshold set at present, M=256 is single-channel grayscale grading number, i represents a grayscale value calculated at present, $Pr(i|C_0)$ represents the ratio of pixels with grayscale values i in the background, and $Pr(i|C_1)$ represents the ratio of pixels with grayscale values i in the foreground.

In the step of obtaining final small-piece image masks through morphological operations on the masks, erosion operations are firstly performed on preliminary image masks to eliminate noise, and then expansion operations are performed to close small holes or opaque areas in objects.

In the step of randomly initializing parameters in the classification model A, random initialization of the parameters conforms to Gaussian distribution:

$$f(x) = \frac{1}{\sqrt{2\pi}\,\sigma} e^{-\frac{(x-\mu)^2}{2\sigma^2}}$$

where $\mu$ is expectation, $\sigma$ is standard deviation, and $\sigma^2$ is variance. Preferably, $\mu$ is 0, $\sigma$ is 1, and $\sigma^2$ is 1.

In the step of building the deep convolutional neural network model, a 56-layer convolutional neural network is built and is mainly divided into three portions: a first portion of a convolutional portion mainly consisting of a convolutional layer and a pooling layer, a second portion of a residual attention module including 4 residual units and 3 attention modules, and a third portion of a softmax layer mapping classification probability values to a 0-1 range. A structure of the deep convolutional neural network model is shown as a FIG. 6.

In the softmax layer, the softmax function is:

$$S_i = \frac{e^i}{\Sigma_j e^j}$$

where i represents input of the $i_{th}$ neuron, e is a natural constant, $\Sigma_j e^j$ represents a sum of powers using e as a base and the neuron j as an exponent, and $S_i$ represents a result of the $i_{th}$ neuron after softmax.

In the step of training the classification model A, a generation process of the classification model includes the following three steps:

step I: inputting the small-piece images into the classification model A, to obtain outputs as the positive confidence coefficients of the small pieces; and determining the positive confidence coefficient of each small piece according to the classification model A;

step II: selecting top k small pieces with the highest positive confidence coefficients in each packet as the inputs of the classification model A, and training the classification model A for a round based on a random gradient descent algorithm; and step III: repeating step I and step II until the classification model A converges or reaches the number of training rounds set in advance.

Figure 5:
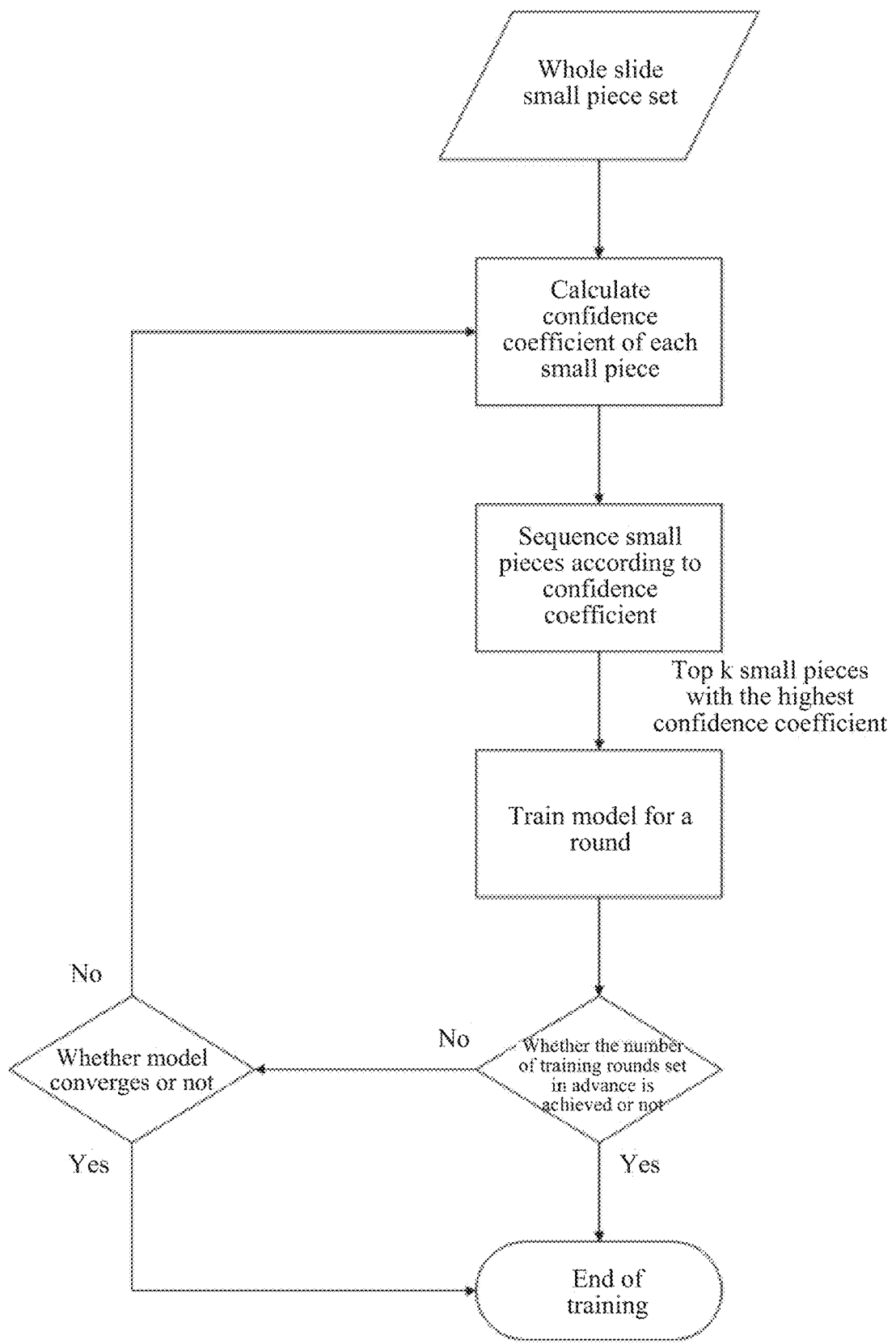
FIG. 5 shows a training flow chart of the deep convolutional neural network model of the automatic classification method of WSIs for cervical tissue pathology based on confidence coefficient selection disclosed by the present invention.
Figure 6:
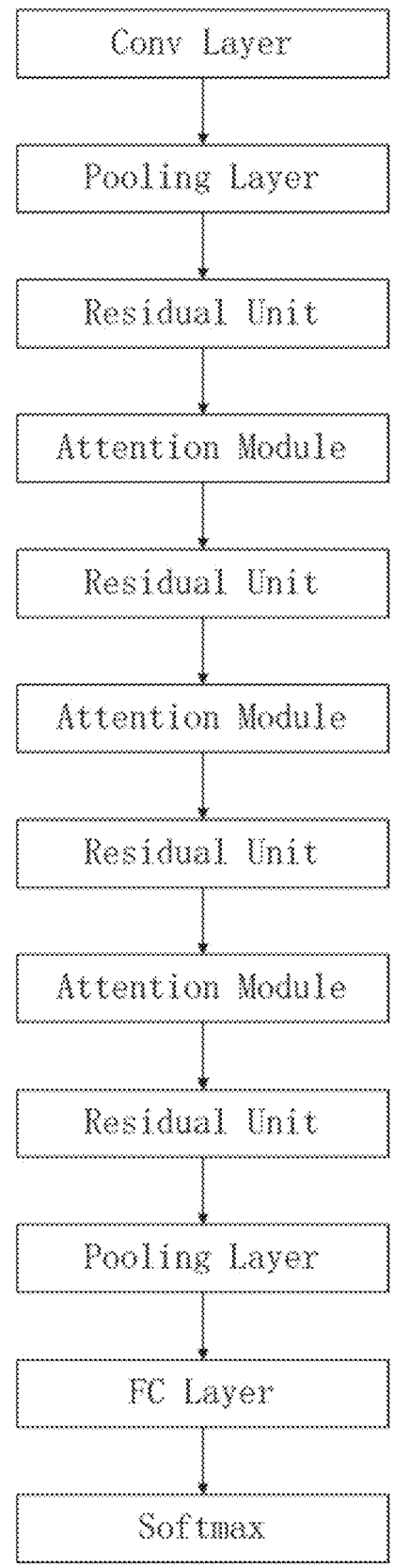
FIG. 6 shows a structural diagram of the deep convolutional neural network model of the automatic classification method of WSIs for cervical tissue pathology based on confidence coefficient selection disclosed by the present invention.

A training flow of the deep convolutional neural network model is shown as FIG. 5.

In step II of selecting top k small pieces with the highest positive confidence coefficients in each packet as the inputs of the classification model A, top k small pieces with the highest positive confidence coefficients in each positive sample packet are used as positive training samples, and top k small pieces with the highest negative confidence coefficients in each negative sample packet are used as negative training samples. Preferably, k is 20.

In the step of training the support vector machine classifier by using the feature vectors generated in step 4 as inputs, feature vectors generated by positive samples are used as the positive training samples, and feature vectors generated by negative samples are used as the negative training samples; and classifying WSIs into two categories according to lesion grades, where Negative for negative WSIs for cervical tissue pathology includes WSIs for cervical tissue pathology of two grades of cervicitis and CIN1, and Positive for positive WSIs for cervical tissue pathology includes WSIs for cervical tissue pathology of three grades of CIN2, CIN3 and cancer. Examples of portions of two categories of WSIs for cervical tissue pathology are shown as FIG. 2 and FIG. 3.

In the step of training the classification model A based on a random gradient descent algorithm, the Adam optimizer is adopted, the learning rate is exponential decay. Preferably, an initial learning rate is 0.0001, batch_size is 32, and weight decay value is 0.0001.

An automatic classification algorithm for WSIs for cervical tissue pathology is still in a theoretical stage at present. Most of current cervical tissue pathology diagnosis algorithms are based on image segmentation and feature extraction, using decision trees and the like methods to perform the classification. Such methods are complex in steps, low in efficiency and low in accuracy. The present invention performs improvement based on deep learning, and provides an automatic classification method of WSIs for cervical tissue pathology based on confidence coefficient selection to improve diagnosis efficiency and accuracy of an original method. The presented method can assist a doctor to perform diagnosis, alleviate working loads of the doctor, improve diagnosis efficiency and provide the doctor with objective and accurate diagnosis results.

Finally, it should be noted that the above descriptions are only preferred examples of the present invention and are not intended to limit the present invention. Although the present invention is described in detail with reference to the foregoing examples, a person skilled in the art can still make modifications to the technical solutions described in the foregoing examples, or make equivalent replacement to some technical characteristics. Any modifications, equivalent substitutions, improvements, etc. made within the spirit and scope of the present invention should be included within the protection scope of the present invention.

What is claimed is:

1. An automatic classification method of whole slide images (WSIs) for cervical tissue pathology based on confidence coefficient selection, comprising the following six steps:

step 1: dividing the WSIs for the cervical tissue pathology into small pieces having set size, gathering the small pieces of each WSI into a packet, and removing blank pieces in the packets;

step 2: building a deep convolutional neural network model recorded as a classification model A, and randomly initializing parameters in the classification model A;

step 3: training the classification model A for designated rounds, and selecting top k small pieces with the highest confidence coefficients in each packet during training each round as inputs;

step 4: using the last fully connected layer of the classification model A as a feature extractor, extracting features of top m small pieces with the highest confidence coefficients in the each packet, and performing sequential arrangement and connection on the extracted features to be used as a feature vector of each WSI of the cervical tissue pathology;

step 5: training a support vector machine classifier using the feature vectors generated in step 4 as inputs, wherein a trained support vector machine classifier is obtained by using sequential minimal optimization in the training process; and step 6: processing the WSIs for the cervical tissue pathology, to be classified, through step 1 and step 4, to obtain the feature vectors of the images, and inputting the feature vectors into the trained support vector machine classifier to realize classification of WSIs; and classifying WSIs into two categories according to lesion grades, including Negative for negative WSIs for cervical tissue pathology and Positive for positive WSIs for cervical tissue pathology.

2. The automatic classification method of WSIs for cervical tissue pathology based on confidence coefficient selection according to claim 1, wherein in step 1 of removing blank pieces in packets, firstly masks of small-piece images are generated based on an Otsu algorithm, and then the masks are subjected to morphological operations to obtain final small-piece image masks; the ratio of the area of blank pieces to that of small-piece images is calculated based on the area of the small-piece image masks to determine whether the small-piece images are blank pieces or not.

3. The automatic classification method of WSIs for cervical tissue pathology based on confidence coefficient selection according to claim 2, wherein the step of obtaining the final small-piece image masks through morphological operations on the masks specially comprises substeps of firstly performing erosion operations on preliminary image masks to eliminate noise, and then performing expansion operations to close small holes or opaque areas in objects.

4. The automatic classification method of WSIs of cervical tissue pathology based on confidence coefficient selection according to claim 1, wherein in step 2 of building the deep convolutional neural network model, a 56-layer convolutional neural network is built and comprises:

(1) a convolutional portion comprising a convolutional layer and a pooling layer, (2) a residual attention module comprising 4 residual units and 3 attention modules, and (3) a softmax layer mapping classification probability values to a 0-1 range.

5. The automatic classification method of WSIs for cervical tissue pathology based on confidence coefficient selection according to claim 4, wherein the softmax layer is a softmax function:

$$S_i = \frac{e^i}{\Sigma_j e^j}$$

wherein i represents input of the $i_{th}$ neuron, e is a natural constant, $\Sigma_j e^j$ represents a sum of powers using e as a base and the neuron j as an exponent, and $S_i$ represents a result of the $i_{th}$ neuron after softmax.

6. The automatic classification method of WSIs for cervical tissue pathology based on confidence coefficient selection according to claim 1, wherein in step 3 of training the classification model A, a generation process of the classification model comprises the following three steps:

step I: inputting the small-piece images into the classification model A, to obtain outputs as positive confidence coefficients of the small pieces; and determining the positive confidence coefficient of each small piece according to the classification model A;

step II: selecting top k small pieces with the highest positive confidence coefficients in each packet as the inputs of the classification model A, and training the classification model A for a round; and step III: repeating step I and step II until the classification model A converges or reaches the number of training rounds set in advance.

7. The automatic classification method of WSIs for cervical tissue pathology based on confidence coefficient selection according to claim 6, wherein in step II of selecting top k small pieces with the highest positive confidence coefficients in each packet as the inputs of the classification model A, top k small pieces with the highest positive confidence coefficients in each positive sample packet are used as positive training samples, and top k small pieces with the highest negative confidence coefficients in each negative sample packet are used as negative training samples.

8. The automatic classification method of WSIs for cervical tissue pathology based on confidence coefficient selection according to claim 1, wherein in step 5 of training the support vector machine classifier by using the feature vectors generated in step 4 as inputs, feature vectors generated by positive samples are used as the positive training samples, and feature vectors generated by negative samples are used as the negative training samples.

9. The automatic classification method of WSIs for cervical tissue pathology based on confidence coefficient selection according to claim 1, wherein in step 6 of classifying WSIs into two categories according to lesion grades: Negative for negative WSIs for cervical tissue pathology, comprising WSIs for cervical tissue pathology of two grades of cervicitis and CIN1, and Positive for positive WSIs for cervical tissue pathology, comprising WSIs for cervical tissue pathology of three grades of CIN2, CIN3 and cancer.

* * * * *